Nov. 18, 1958  E. K. JOHANSEN  2,860,738
BRAKE MECHANISM
Original Filed Nov. 14, 1950  5 Sheets-Sheet 1
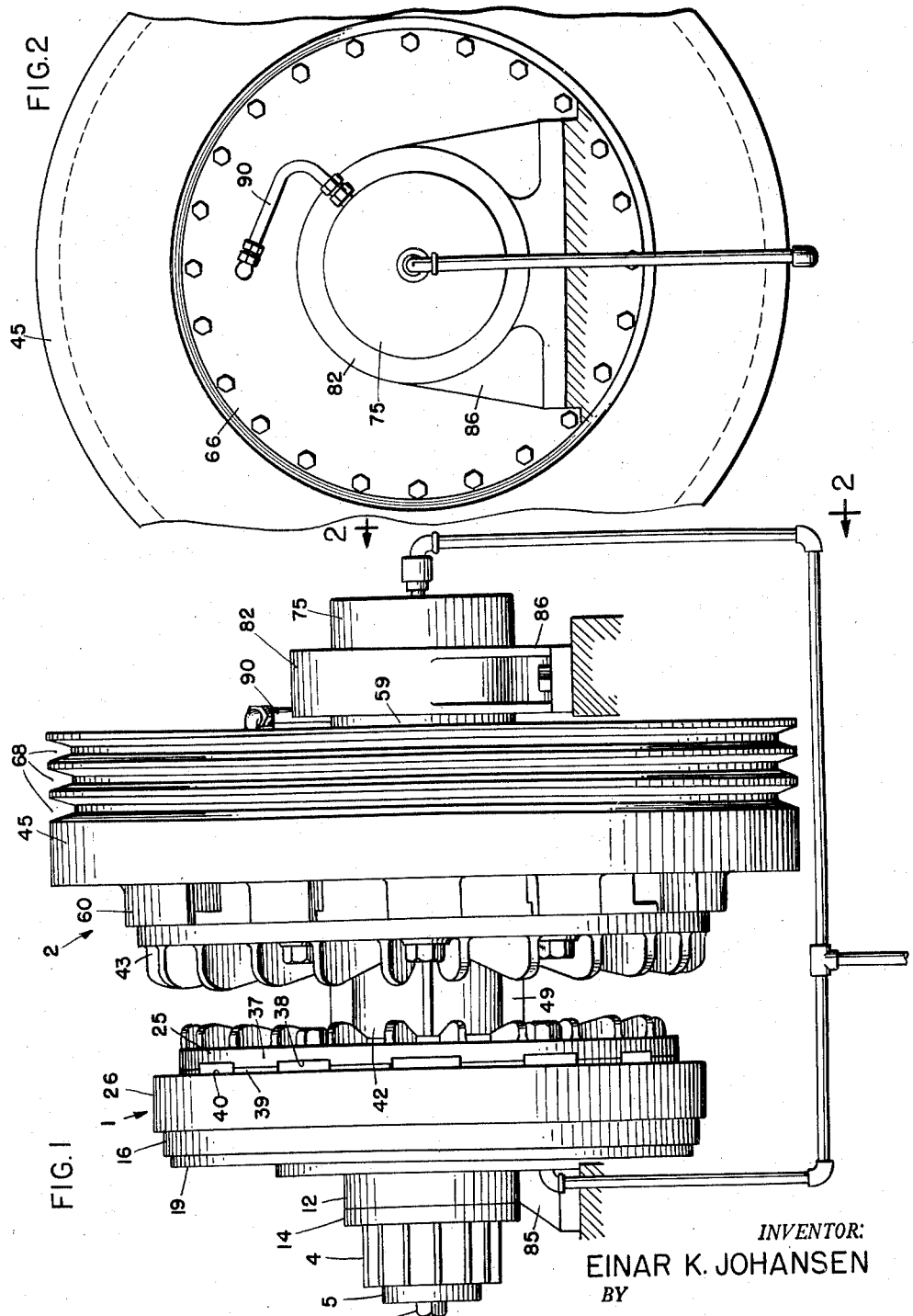
INVENTOR:
EINAR K. JOHANSEN
BY
ATT'YS Nov. 18, 1958     E. K. JOHANSEN     2,860,738

BRAKE MECHANISM

Original Filed Nov. 14, 1950     5 Sheets-Sheet 2

INVENTOR:
EINAR K. JOHANSEN
BY
*Marshall, Johnston, Cook & Root.*
ATT'YS

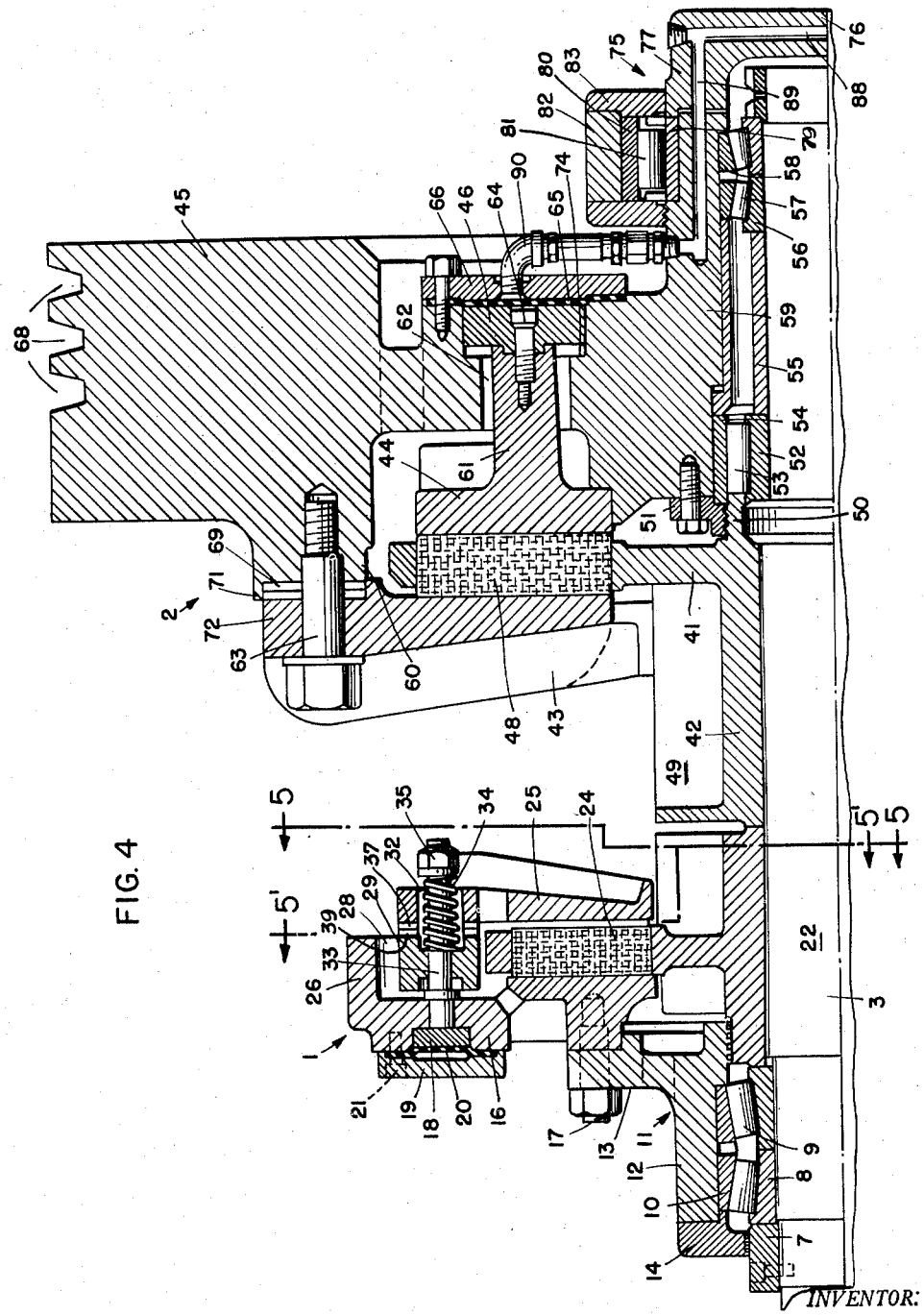

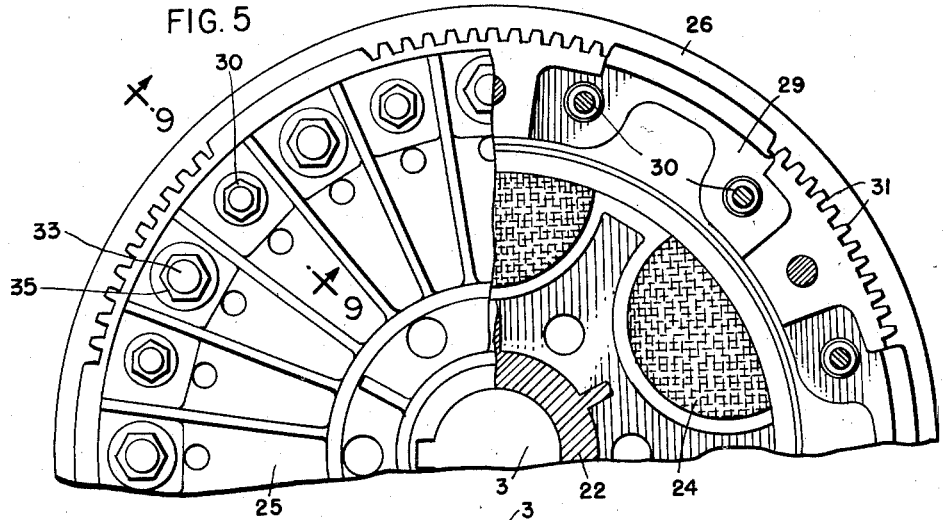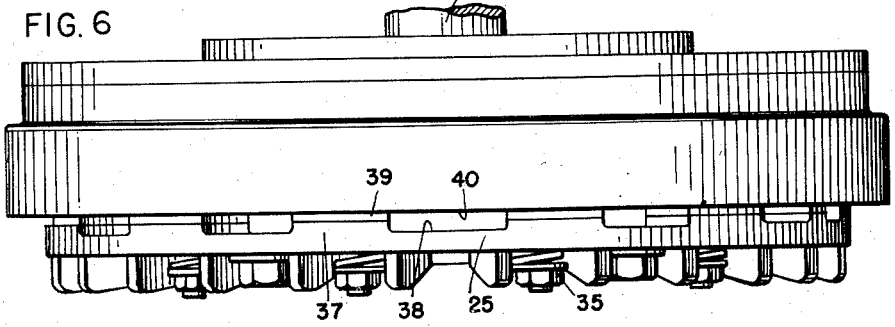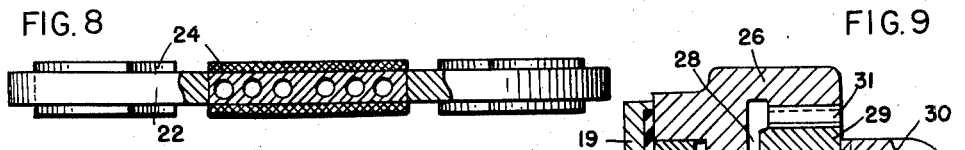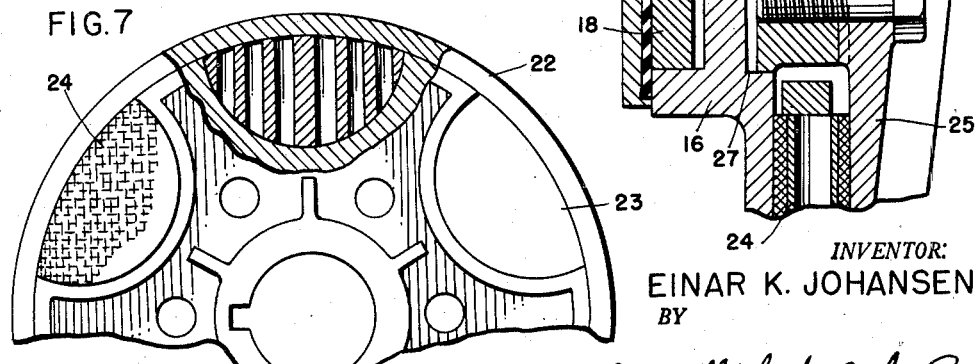

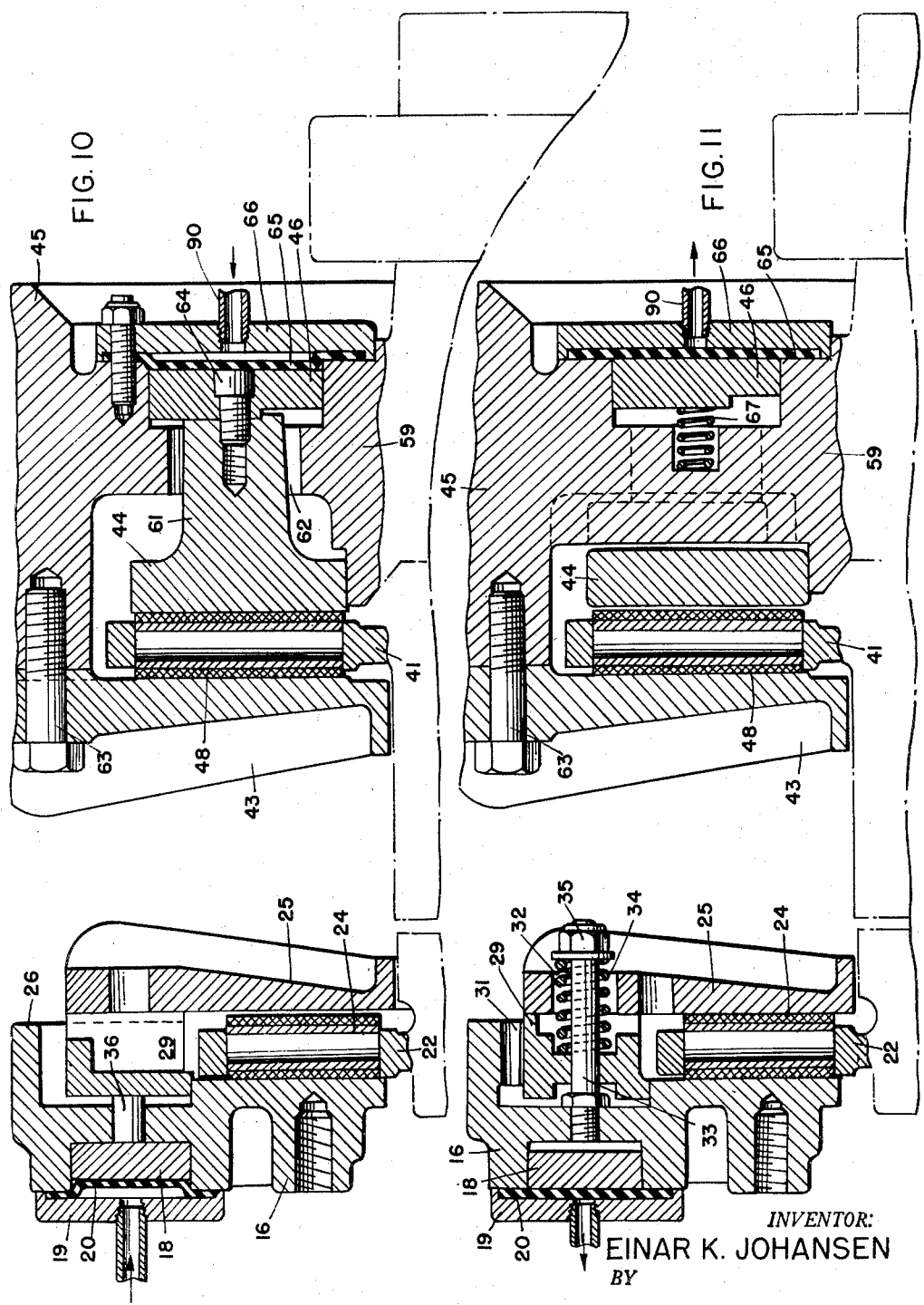

United States Patent Office 2,860,738
Patented Nov. 18, 1958

2,860,738

BRAKE MECHANISM

Einar K. Johansen, Oak Park, Ill., assignor, by mesne assignments, to U. S. Industries, Inc., a corporation of Delaware Original application November 14, 1950, Serial No. 195,661, now Patent No. 2,785,781, dated March 19, 1957. Divided and this application June 29, 1953, Serial No. 364,637

4 Claims. (Cl. 188—170)

This invention relates in general to a combined clutch and brake mechanism for starting and stopping the rotation of a shaft, and is particularly designed to overcome certain inherent disadvantages in similar mechanisms heretofore known. More particularly, the present invention relates to a brake mechanism. While the clutch and brake mechanism embodying the present invention is particularly adapted for use on metal working and forming presses, it is to be understood that the use of the invention is not necessarily so limited. The structure of the clutch per se has been disclosed and claimed in my earlier co-pending application Serial No. 195,661, filed November 14, 1950, now Patent No. 2,785,781. This is a division of said application and is directed more particularly to the brake.

The mechanism embodies a clutch and brake device wherein the brake is normally engaged and the clutch is normally disengaged so as to prevent the shaft, on which the mechanism is mounted, from rotating. Air or other fluid under pressure is admitted to passageways in the structure for the purpose of engaging the clutch and disengaging the brake, thereby causing the shaft to rotate.

Mechanisms of this character, particularly when used in connection with large metal forming presses, may weigh as much as 20,000 pounds. Some of the parts of the clutch, such as the flywheel, are always rotating; other parts are always stationary, and still others start and stop with the rotation of the shaft. Heretofore, a great mass of weight within the mechanism was caused to start and stop with the shaft. The disadvantages inherent in this type of construction will become obvious when it is understood that the inertia of such a large mass requires more power to start and greater braking power to stop. It is, therefore, highly desirable that all parts possible should be mounted on the flywheel which is always rotating. This is particularly true with the heavier parts.

One of the advantages of the present construction is the relatively small mass which starts and stops during the operation of the device, thereby reducing considerably the inertia.

Another disadvantage heretofore present in clutch and brake mechanisms of this character was the necessity of completely disassembling the structure in order to reline the brake and clutch. The size of the structure made it necessary to use hoists and other gear to disassemble the parts. This disadvantage has also been overcome in the present invention by providing a novel arrangement where the parts may be merely separated, rather than disassembled, and the new lining inserted.

There are many other advantages present in this improved structure obviating the disadvantages of prior structures, which will become apparent as the description proceeds.

It is therefore an object of this invention to provide a new and improved braking mechanism arranged on a shaft and having elements movable axially of the shaft for braking engagement.

Still another object of the invention is the provision of new and improved braking elements, whereby the mean radius of the lining surface or the center of gyration is increased so that the elements will have a maximum capacity for a given brake diameter.

Still another and more specific object of the invention is the provision of braking elements, wherein a plurality of substantially semicircular lining members are disposed adjacent the periphery of the element, thereby increasing the mean radius of the lining surface or the center of gyration to a maximum.

A further object of the invention is the provision of a novel type of ring members which are adapted to cooperate to compensate for wear on the friction engaging surfaces of the brake members.

A still further and specific object of the invention is to provide a novel structure, whereby the springs which normally hold the brake in engagement can be replaced without disassembling the entire structure.

Other objects and advantages of the invention will become apparent upon reading the following description taken in conjunction with the accompanying drawings in which:

Fig. 1 is an elevational view of the clutch and brake mechanism embodying the present invention;

Fig. 2 is an end elevational view looking in the direction of the arrows 2—2 of Fig. 1;

Fig. 4 is a fragmentary longitudinal vertical sectional view through the device showing the brake disengaged and the clutch engaged;

Fig. 5 is a fragmentary vertical sectional view through the brake structure with certain parts broken away so that the sections are taken along the planes of lines 5—5 and 5'—5' of Fig. 4;

Fig. 6 is a plan view of the device shown in Fig. 5;

Fig. 7 is a fragmentary elevational view of the brake spider;

Fig. 8 is a plan view of the structure shown in Fig. 7 with a portion thereof broken away and shown in section for the sake of clarity;

Fig. 9 is an enlarged fragmentary sectional view taken along the plane of line 9—9 of Fig. 5;

Fig. 10 is a somewhat enlarged fragmentary longitudinal vertical sectional view through the clutch and brake mechanisms illustrating the brake disengaged and the clutch engaged; and Fig. 11 is a view similar to Fig. 10 but showing the brake engaged and the clutch disengaged.

Figure 3:
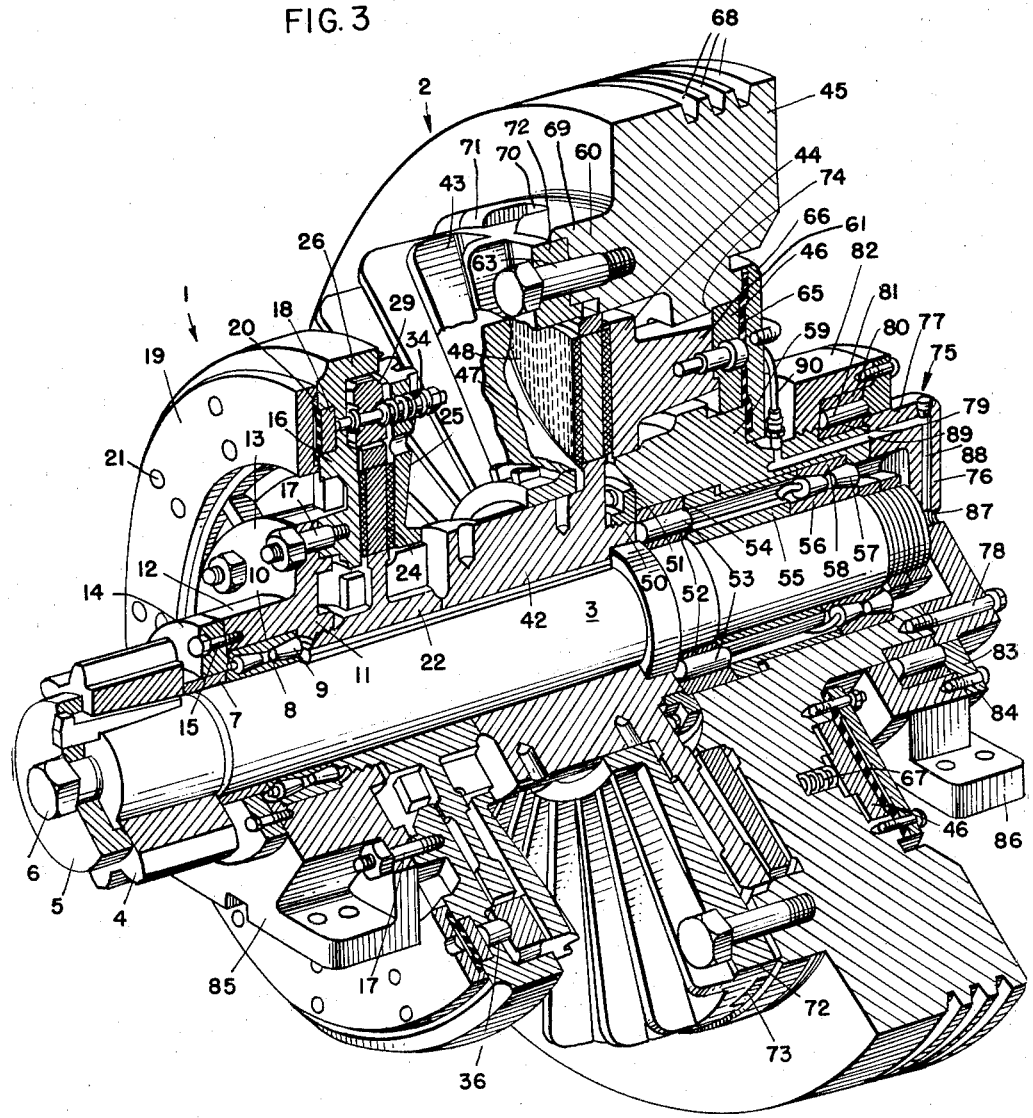
Fig. 3 is an angular cross-sectional view in perspective of the clutch and brake mechanism embodying the present invention.

The clutch and brake mechanisms embodying the present invention constitute a unitary structure adapted to be mounted on a shaft to be driven thereby. The construction is such that a plurality of spring members normally maintain the brake in engagement so that the shaft is prevented from rotating. The clutch portion includes a rotating member such as a flywheel gear or pulley, and various other parts connected thereto which constantly rotate free of the shaft. When fluid under pressure is admitted to the brake and clutch mechanisms simultaneously, the brake is released or disengaged to permit the shaft to rotate, and the clutch drivingly engages the flywheel or other rotating member with the shaft so as to drive the shaft. When this fluid pressure is released, resilient means causes the clutch mechanism to become disengaged and simultaneously causes the brake to engage so that rotation of the shaft is stopped.

When the clutch and brake mechanisms are applied to a metal forming press, the arrangement is such that rotation of the shaft will cause the press to operate through one complete cycle thereof. As stated before, however, it is to be understood that the mechanisms disclosed herein have applications other than to a metal forming press. The structure may be applied to any machine or mechanism where a shaft is to be driven.

Referring now more particularly to the drawings, the brake is indicated generally by the numeral 1 and the clutch is indicated generally by the numeral 2. The brake is made up of a number of different parts some of which start and stop with the shaft, and others of which remain fixed at all times. In general, these parts may be clearly seen in Fig. 3 where the shaft on which the device is mounted is indicated by the numeral 3. One end of the shaft may carry a pinion 4 for the purpose of driving some other mechanism when the shaft rotates. The pinion 4 may be mounted in any suitable manner on the end of shaft 3 and held in place by means such as a plate 5 and bolt 6.

A spacer ring 7 may then be located around the shaft 3 and adjacent the pinion 4. The inner rotating bearing race 8 for the bearings 9 is positioned on the shaft adjacent the spacer ring 7. The inner bearing race 8 rotates with the shaft while the outer bearing race 10 remains stationary. The bearing races 8 and 10 are mounted within a bearing member 11 consisting of an axial hub portion 12 and a radial flange portion 13. The hub 12 thereof has secured thereto an outer ring member 14 by means of bolts 15, and the flange portion 13 thereof is secured to the brake ring 16 by means of bolts 17. The brake ring 16 is provided with an annular groove which receives the axially movable brake piston plate or ring 18. A brake diaphragm clamping ring 19 is also provided with an annular recess on its inner face to receive the annular diaphragm 20. The diaphragm clamping plate 19 is secured to the brake ring 16 by suitable means such as bolts 21 and is so located with respect thereto as to clamp the inner and outer edges of the diaphragm 20 therebetween. Thus, the portion of the diaphragm 20 which bears against the air piston plate or ring 18 is free to move upon the application of fluid pressure thereto, and thereby moves the air piston plate or ring 18 in an axial direction.

A brake spider 22 is keyed to shaft 3 and is positioned adjacent the inner bearing race 8. This brake spider 22 is shown in more detail in Figs. 5 to 9, inclusive. For the present it is sufficient to note that this brake spider 22 is provided with a plurality of substantially semicircular openings 23 around the periphery thereof into which individual friction members 24 may be inserted. These friction members are faced on each side thereof with suitable friction material so as to have proper braking action. One face of each friction element is adapted to bear against the brake ring 16. The opposite face of each friction element faces toward a brake reaction plate 25 mounted in spaced relation with respect to the brake ring 16. The brake ring 16 has an outer overhanging axially extending flange 26 and an annular shoulder 27 spaced radially inwardly therefrom to provide an annular recess 28 (Figs. 4 and 9). An annular ring 29 surrounds the brake spider 22 and is received within the recess 28 for axial sliding movement.

The brake reaction plate 25 is secured to the ring 29 at a plurality of circumferentially spaced points by means of bolts 30, whereby the plate and ring will slide together in an axial direction (Fig. 9) during operation of the brake.

The outer edge of ring 29 and the inner surface of the axial flange 26 are provided with interengaging teeth 31 (Fig. 9) to prevent relative rotation between the two elements, but to permit relative axial movement therebetween. The brake reaction plate 25 is provided with a plurality of circumferentially spaced axially extending openings 32 (Fig. 4) near the outer edge thereof which are in alignment with openings through ring 29 for the reception of a stud 33. There is a stud 33 for each of the openings 32 and one end thereof is threaded to engage a threaded opening in the brake ring 16. A coiled compression spring 34 surrounds a portion of the stud 33 and bears at one end thereof against a nut 35 on the outer end of the stud. The other end of spring 34 bears against the base of an enlarged recess in the ring 29, as clearly illustrated in Figs. 3, 4 and 11. The force of these circumferentially spaced springs 34 will act to urge ring 29 and reaction plate 25 toward the left as viewed in the above figures so that the inner face of reaction plate 25 will be urged against one face of the friction elements 24. The brake is thus maintained normally engaged, as shown in Fig. 11. The studs 33 and nuts 35 are spaced circumferentially around reaction plate 25 between the bolts 30, as clearly shown in Fig. 5.

A plurality of pins 36 (Figs. 3 and 10) are mounted for axial sliding movement in openings in the brake ring 16. The length of each pin 36 is such that the outer end thereof will bear against the air piston plate or ring 18. The opposite end of pin 36 bears against one face of ring 29. When air is admitted to the brake structure and is delivered to the annular recess on the inner face of the brake diaphragm clamping plate 19 to urge the diaphragm 20 to its position, shown in Figs. 3, 4 and 10, this movement of the diaphragm will cause a corresponding axial movement of the air piston ring 18. This movement of the air piston ring 18 will be transmitted to the ring 29 through the medium of pins 36. Since the brake reaction plate 25 is secured to ring 29 by bolts 30, it will become clear that movement of ring 29 will carry with it a similar axial movement of reaction plate 25. When the reaction plate is thus moved under air pressure, the inner face thereof will move in a direction away from the friction elements 24 in the brake spider 22 thereby releasing or disengaging the brake.

Both the brake and clutch mechanisms include structures whereby the replacement of the friction elements is considerably simplified. Heretofore, it has been necessary to disassemble the device in order to remove and replace worn friction elements. In the present instance, it is a simple matter to replace any one or all of the friction elements 24 by merely removing each of the bolts 30 thereupon permitting the brake reaction plate 25 to be moved in an axial direction away from the brake spider 22. The distance through which the reaction plate 25 may be moved is sufficient to enable the operator of the device to reach the friction elements for removal and replacement. With the new friction elements in place, the reaction plate 25 may be slipped back into place and again secured to the ring 29 by means of bolts 30.

Another feature contained in both the brake and clutch mechanisms is the provision of an adjustment to compensate for wear on the friction elements. The structure which enables this adjustment to be made may be more clearly seen in Fig. 6. The reaction plate 25 is provided around the periphery thereof with a plurality of spaced axially extending projections 37. A recess 38 is located between each of the projections 37. Ring 29 also has a similar plurality of like circumferentially spaced projections 39 adapted to normally abut the projections 37 on the brake reaction plate 25. There are recesses 40 between the projections 39 similar to the recesses 38 on the brake reaction plate 25. In normal operation, with fresh friction plates in the brake spider, the corresponding projections 37 and 39 will be in abutment. The axial length of these projections is such that the proper amount of pressure will be applied as between the inner face of reaction plate 25 and the various friction elements 24 to cause a braking action. When the friction elements have become partially worn and slippage occurs between the friction elements and the brake reaction plate, an adjustment may be made by removing bolts 30 and the brake reaction plate 25 may then be slipped back beyond the nuts 35 to permit a relative rotation between the brake reaction plate 25 and ring 29. The rotation will be sufficient to bring the projections 37 into alignment with recesses 40. Likewise, the projections 39 will be brought into register with recesses 38. This enables the brake reaction plate 25 to be moved into closer relationship with ring 29. It is clear then that the result will be to urge the brake reaction plate 25 into greater frictional contact with the partially worn friction elements 24. The force exerted by the various springs 34 can, of course, be adjusted by movement of nut 35 to the proper position, if necessary.

The clutch mechanism, which forms no part of the present invention, generally indicated by the numeral 2 comprises mainly the various parts illustrated in the views of Figs. 3 and 4. These parts include the clutch spider 41 having a hub 42 thereon, the clutch reaction plate 43, pressure plate 44, flywheel 45 and air piston ring 46.

The clutch spider 41 is constructed similarly to the brake spider 22 by providing a plurality of circumferentially spaced substantially semicircular openings 47. Each opening 47 is adapted to receive a clutch lining segment or friction element 48. The clutch spider 41 is keyed to shaft 3 and remains stationary or rotates with the shaft. The hub 42 has a plurality of radially extending fins or ribs 49 over which the clutch reaction plate 43 is adapted to fit when assembled, as shown in Fig. 4.

The outer end of hub 42 on the clutch spider 41 is provided with an annular rib portion 50. A sealing ring 51 surrounds the annular rib portion 50 (Fig. 3). An inner bearing race 52 is mounted on the shaft adjacent the outer end of hub 42 and supports bearings 53. A continuously rotating outer bearing race 54 engages the bearings 53. A spacer member 55 abuts at one end thereof against the inner bearing race 52 and separates therefrom the inner bearing race 56. Bearing members 57 are disposed between the inner bearing race 56 and the outer bearing race 58.

The flywheel 45 has a hub portion 59 thereon which fits over the outer bearing races 54 and 58 and rotates with the seal ring 51. The pressure plate 44 is assembled with the flywheel 45 and is located within the axially extending flange part 60 on the inner face of the flywheel.

The pressure plate 44 has a plurality of axially extending circumferentially spaced extensions 61 adapted to fit into corresponding openings 62 in the flywheel 45. The clutch reaction plate 43 is then secured to the flywheel 45 by a plurality of bolts 63. The assembled parts appear as in Figs. 3, 4, 10 and 11 where it is seen that the clutch reaction plate 43 is so arranged as to bear against one face of the friction elements 48. The pressure plate 44 is disposed within the flywheel and is movable axially with respect thereto so that one face thereof may engage the opposite face of the friction elements 48.

The air piston plate 46 is then mounted in abutting relation to the axially extending members 61 on the pressure plate 44. The air piston plate and pressure plate are then secured together by means such as the bolts 64 (Fig. 10).

The annular clutch diaphragm 65 is then clamped in place by the clutch diaphragm clamping plate 66. The inner and outer edges of the diaphragm 65 are clamped to permit axial movement of the diaphragm under air pressure. When air under pressure is admitted to the structure at one side of diaphragm 65, movement of the diaphragm will cause the air piston plate 46 and pressure plate 44 to move axially toward the clutch spider 42 and cause the inner face of the pressure plate to frictionally engage the friction elements 48, thus engaging the clutch.

The clutch is maintained in a normally disengaged position by reason of a plurality of coiled compression springs 67 (Figs. 3 and 11) located in axially extending recesses in the flywheel and bearing outwardly against the inner face of the air piston plate 46. Thus, the clutch is normally disengaged but may be engaged by application of air pressure against diaphragm 65 to move the air piston plate and pressure plate into engagement with the friction elements.

The flywheel 45 and all of the parts connected thereto rotate continuously. The flywheel is preferably provided with a plurality of grooves 68 on its periphery so as to receive a plurality of driving belts connected to a suitable source of power. Since the brake is normally engaged, the shaft will not rotate. When air is admitted to the structure through passages provided therefor, the brake diaphragm 20 will move the brake reaction plate 25 against the force of springs 34 to disengage the brake. At substantially the same time, or immediately thereafter, the clutch diaphragm 65 will move under air pressure and cause axial movement of the pressure plate 44 against the force of springs 67 to engage the clutch. Engagement of the continuously rotating flywheel and its associated parts with the friction elements 48 on the clutch spider 42 will cause the clutch spider to rotate and carry with it the shaft to which it is keyed.

The structure just described with respect to the clutch mechanism enables the replacement of worn friction elements easily and quickly in a manner similar to that described above with respect to the brake. When the clutch friction elements become worn sufficiently to necessitate replacement, the various bolts 63 may be removed, thereby allowing the clutch reaction plate 43 to be slipped along the hub of the clutch spider on which it is mounted a sufficient distance away from the friction elements so as to permit the operator to reach the elements for removal and replacement. This avoids the heretofore difficult and time consuming task of disassembling the clutch to replace worn linings.

A further feature of the clutch mechanism is the adjustment which may be made between the clutch reaction plate and the flywheel to compensate for partially worn friction elements. The flange 60 is formed with a plurality of alternate projections 69 and recesses 70. Each projection 69 has an overhanging portion 71 for the purpose of centering the clutch reaction plate 43. Since these overhanging portions are solely for the purpose of centering, it will be obvious that they may be located on the outer or inner preiphery of the flywheel.

The clutch reaction plate 43 also has at the outer periphery thereof a plurality of alternate axially extending projections 72 and recesses 73. With fresh friction elements inserted in the clutch spider, the mechanism is assembled so that the projections 72 on the clutch reaction plate 43 will abut the projections 69 on the flywheel 45. This position of the parts is that which is shown in Figs. 3 and 4. When the friction elements have become partially worn, but not to a degree sufficient to require replacement, the bolts 63 may be removed and the clutch reaction plate may be rotated an amount sufficient to bring the projections 72 thereon into alignment with the recesses 70 on the flywheel. When the bolts 63 are then reinserted, they may be tightened to bring the clutch reaction plate closer to the flywheel and again into engagement with the partially worn elements.

An annular shoulder 74 on the flywheel acts as a stop against which the air piston plate 46 may come to limit the movement thereof toward the clutch spider. Thus, this stop shoulder acts as an indicator as to when the adjustment just described above should be made.

The construction of the brake and clutch spiders has many advantages over structures heretofore used and perhaps the most important of which is the greater capacity which may be obtained for a given diameter. Heretofore, friction elements had been shaped in the form of completely circular members. In such case the center of gyration or the mean radius of the lining surface was necessarily closer to the center of rotation of the spider. By providing substantially semicircular openings near the periphery of the spider for the reception of substantially semicircular elements, the center of gyration is increased over that obtained by the use of circular friction elements thereby obtaining the maximum capacity for any given clutch or brake diameter.

A further advantage which has been obtained by the present construction is that the greatest amount of mass possible has been mounted on the flywheel so as to rotate continuously therewith, thereby resulting in a minimum mass required to start and stop rotation with the shaft. Thus, the heavier parts are always rotating and the lighter parts are either stationary or stop and start with movement of the shaft, thereby reducing the inertia to a minimum. As may be seen from viewing Fig. 3, the stationary parts of the brake include the seal ring 14, the rings 11, 16 and 29 and the reaction plate 25. The parts of the brake mechanism which stop and start include only the spacer ring 7, the inner bearing race 8 and the brake spider 22. There are no continuously moving parts in the brake structure.

The only parts of the clutch mechanism which are required to stop and start with rotation of the shaft, are the clutch spider, the inner bearing races 52 and 56 and the spacer 55. All other parts of the clutch rotate continuously so that the resulting mass of the clutch and brake combined which is required to stop and start with rotation of the shaft has been minimized.

In clutch mechanisms heretofore used of the type operated by fluid pressure, it was customary to have the air enter the shaft at one end thereof and then pass through a sealing means to the flywheel. This structure necessitated a large seal which became worn in a relatively short period of time thereby necessitating frequent replacement. This objection to earlier structures has been overcome in the present invention by extending the flywheel hub to the stationary bearing bracket, thereby permitting air to be admitted through a smaller packing which requires no dismantling to replace.

The flywheel hub extension is generally indicated by the numeral 75 in Figs. 1, 3 and 4 and comprises a face portion 76 having an axially extending flange portion 77. The hub extension 75 is placed over the end of shaft 3 in abutting relationship to the outer end of the flywheel hub 59 and is secured thereto by a plurality of spaced bolts 78. The outer end of the flywheel hub 59 is provided with an annular seat to receive an inner bearing race 79 which rotates continuously with the flywheel. The outer stationary bearing race 80 confines roller bearings 81 against the inner bearing race 79. A bearing housing 82 encloses the bearing member formed by the inner and outer races 79 and 80 and has a removable outer ring 83 secured thereto by means of bolts 84.

The entire structure is mounted on bearing brackets 85 and 86. The ring 11 is formed as an integral part of the bearing bracket 85 so that the hub 12 thereof forms a bearing mounting for the bearings at the brake end of the structure.

At the clutch end of the structure the bearing housing 82 is formed as an integral part of the bearing bracket 86 so that the bolts 84 securing ring 83 to the bearing housing 82 thereby secure the clutch end of the structure to the bearing bracket 86.

A centrally disposed opening 87 in the flywheel hub extension 75 admits air under pressure to an air passage 88 extending radially outwardly therefrom in the face of the hub extension 75. The air passage 88 communicates with a second air passage 89 extending axially through the flywheel hub 59. From this point the air may be conveyed to the diaphragm clamping plate 66 and therethrough to one side of the diaphragm 65. The air may be conveyed from passage 89 to diaphragm clamping plate 66 by means of a tube 90 or the structure may be such as to have air passages through the flywheel hub and clamping plate to serve the same purpose. The packing for sealing the end of the shaft may be greatly reduced in size and located in the opening 87. It may be replaced merely by removing the air connection to the opening 87.

It will be evident from the foregoing description that the structure of the clutch and brake mechanisms disclosed herein embodies certain novel features of design and results in many advantages over similar structures heretofore known. One of the chief advantages arising out of this structure is the comparative ease and speed with which the friction elements of both the brake and clutch may be replaced. The removal of a few bolts and sliding the reaction plate of either the brake or clutch away from its respective spider will enable the operator to reach all of the friction elements for quick replacement. This overcomes the necessity of completely dismantling the apparatus for the purpose of replacing worn friction elements.

Another advantage is the adjustability of the brake and clutch reaction plates to compensate for partially worn friction elements thus making it unnecessary to replace these elements as often as has been necessary heretofore. The great reduction in the mass which is required to start and stop with rotation of the shaft results in less power necessary to start rotation of the shaft and enables a speedier response to the action of both the clutch and brake. In actual practice it has been determined that the mass of the parts that start and stop with rotation of the shaft has been reduced by about 70 percent as compared to conventional units. It has been determined that when this clutch and brake mechanism has been applied to a metal forming press there is a net reduction of about 49 percent in the total power required to put the forming slide in motion. This result in reduction of power is obtained because the parts which stop and start rotation of the shaft rotate with the drive pinion and the relatively high speed thereof multiplies the effect of the mass inertia.

The novel shape of the friction elements which enables them to be located nearer the peripheral edge of the brake and clutch spiders increases the center of gyration to such an extent that the reduced demand upon these friction elements permits them to last longer and to operate at a lower temperature.

The replacement of the other parts of the apparatus may also be accomplished in less time than has been heretofore possible. For example, the springs 34 which normally maintain the brake in engagement may be replaced without any dismantling of the device merely by removing the nut 35, removing the spring 34 from the stud, and replacing it with a new one.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A brake mechanism comprising a shaft, a brake spider fixed to the shaft and rotatable therewith, a plurality of substantially semicircular recesses circumferentially spaced along the outer periphery of said brake spider, removable friction means carried in said recesses on said spider, a fixed brake ring at one side of said spider and extending beyond the periphery thereof, a non-rotatable brake reaction plate at the other side of said spider, means including interengaging axially extending and radially projecting teeth mounting said reaction plate on said brake ring for movement axially with respect thereto into and out of engagement with the friction means on said spider, yieldable means normally urging said reaction plate into engagement with said friction means, and means adapted to move said reaction plate out of engagement with said friction means against the force of said yieldable means, thereby to permit rotation of the shaft.

2. A brake mechanism comprising a shaft, a brake spider fixed to the shaft and rotatable therewith, a plurality of circumferentially spaced and substantially semicircular recesses in said spider removable friction means mounted in said recesses on said spider, a fixed brake ring at one side of said spider and extending beyond the periphery thereof, a non-rotatable brake reaction plate at the other side of said spider, means mounting said reaction plate for a limited movement axially into and out of engagement with said friction means, yieldable means normally urging said reaction plate into engagement with said friction means, means adapted to move said reaction plate out of engagement with said friction means against the force of said yieldable means, said mounting means being so arranged and constructed that said reaction plate can be moved axially manually a distance away from said friction means without affecting the position of said yieldable means, whereby said friction means may be manually replaced without disassembling the brake.

3. A brake mechanism comprising a shaft, a brake spider fixed to the shaft and rotatable therewith, friction means mounted on said spider, an annular ring surrounding said spider, a fixed brake ring at one side of said spider extending beyond the periphery of said spider and having an annular recess therein to receive said annular ring, a brake reaction plate on the other side of said spider, means securing said annular ring to said reaction plate, means mounting said annular ring and reaction plate for movement together in an axial direction, yieldable means normally urging said reaction plate into engagement with said friction means, and interengaging means including alternate projections and recesses on said annular ring and said reaction plate, whereby the reaction plate may be adjusted relative to said annular ring to compensate for wear of said friction means.

4. A brake mechanism comprising a shaft, a friction member mounted on said shaft for corotation therewith, an annular ring surrounding said friction member, a fixed brake ring at one side of said friction member extending beyond the outer edge thereof and having an annular recess therein to receive said annular ring, an axially movable brake reaction plate at the other side of said friction member, means fixedly securing said annular ring to said reaction plate, interengaging radially projecting means on said annular ring and brake ring preventing relative rotation therebetween while permitting relative axial movement therebetween, yieldable means normally urging said reaction plate into engagement with said friction member for locking said shaft to said fixed brake ring, and means adaptable to move said reaction plate out of engagement with said friction member against the force of said yieldable means thereby to unlock said shaft and fixed brake ring and permit relative rotation therebetween.

References Cited in the file of this patent

UNITED STATES PATENTS

| | | |
|---|---|---|
| 1,933,176 | Jonsson | Oct. 31, 1933 |
| 2,349,132 | Baird | May 16, 1944 |
| 2,584,192 | Danly et al. | Feb. 5, 1952 |